United States Patent
Ueda

(10) Patent No.: US 6,269,119 B1
(45) Date of Patent: *Jul. 31, 2001

(54) SOUND-PICTURE SYNCHRONOUS COMPRESSION AND SYNCHRONOUS REPRODUCTION SYSTEM

(75) Inventor: Hiroaki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,150

(22) Filed: Jun. 9, 2000

Related U.S. Application Data

(62) Division of application No. 09/022,540, filed on Feb. 12, 1998, now Pat. No. 6,104,756.

(30) Foreign Application Priority Data

Feb. 12, 1997 (JP) .................................................. 9-027140

(51) Int. Cl.[7] .................................................. H04B 1/66
(52) U.S. Cl. ...................................... 375/240.01; 386/39
(58) Field of Search ......................... 375/240.01, 240.28; 348/423.1, 515, 384.1, 42, 425.4, 390.1, 516, 845.1, 845.2; 386/104, 39; 345/302

(56) References Cited

U.S. PATENT DOCUMENTS

| | | | |
|---|---|---|---|
| 5,467,139 | * 11/1995 | Lankford | 375/240.01 |
| 5,481,543 | * 1/1996 | Veltman | 348/423.1 |
| 5,508,816 | * 4/1996 | Ueda et al. | 386/104 |
| 5,583,652 | * 12/1996 | Ware | 386/104 |
| 5,784,572 | * 7/1998 | Rostoker et al. | 386/39 |
| 5,808,722 | * 9/1998 | Suzuki | 348/515 |
| 6,104,756 | * 8/2000 | Ueda | 375/240 |

FOREIGN PATENT DOCUMENTS

| | | |
|---|---|---|
| 7-64730 | 3/1995 | (JP) . |
| 7-75059 | 3/1995 | (JP) . |
| 7-110756 | 4/1995 | (JP) . |
| 7-184143 | 7/1995 | (JP) . |

* cited by examiner

*Primary Examiner*—Chris Kelley
*Assistant Examiner*—Gims Philippe
(74) *Attorney, Agent, or Firm*—Foley & Lardner

(57) ABSTRACT

In a sound-picture synchronous compression device, the picture compression process is performed on a designated amount of picture codes. Then, a necessary amount of sound codes is calculated on the basis of a time of the picture compression process and is subjected to sound compression process. Consequently, compressed picture codes and compressed sound codes are transmitted to a sound-picture synchronous reproduction device. Herein, the picture reproduction process is performed on a designated amount of the compressed picture codes. Then, a necessary amount of the compressed sound codes is calculated on the basis of a time of the picture reproduction process and is subjected to sound reproduction process. Thus, the device reproduces the picture codes and sound codes, based on which pictures and sounds are output by the monitor and speaker respectively. The switching between the sound processing and picture processing in compression and reproduction is made with a reduced overhead, while the switching is performed in such a way that the sound processing does not break off. Incidentally, the picture codes correspond to a number of macro blocks while the sound codes correspond to a number of AAUs.

10 Claims, 15 Drawing Sheets

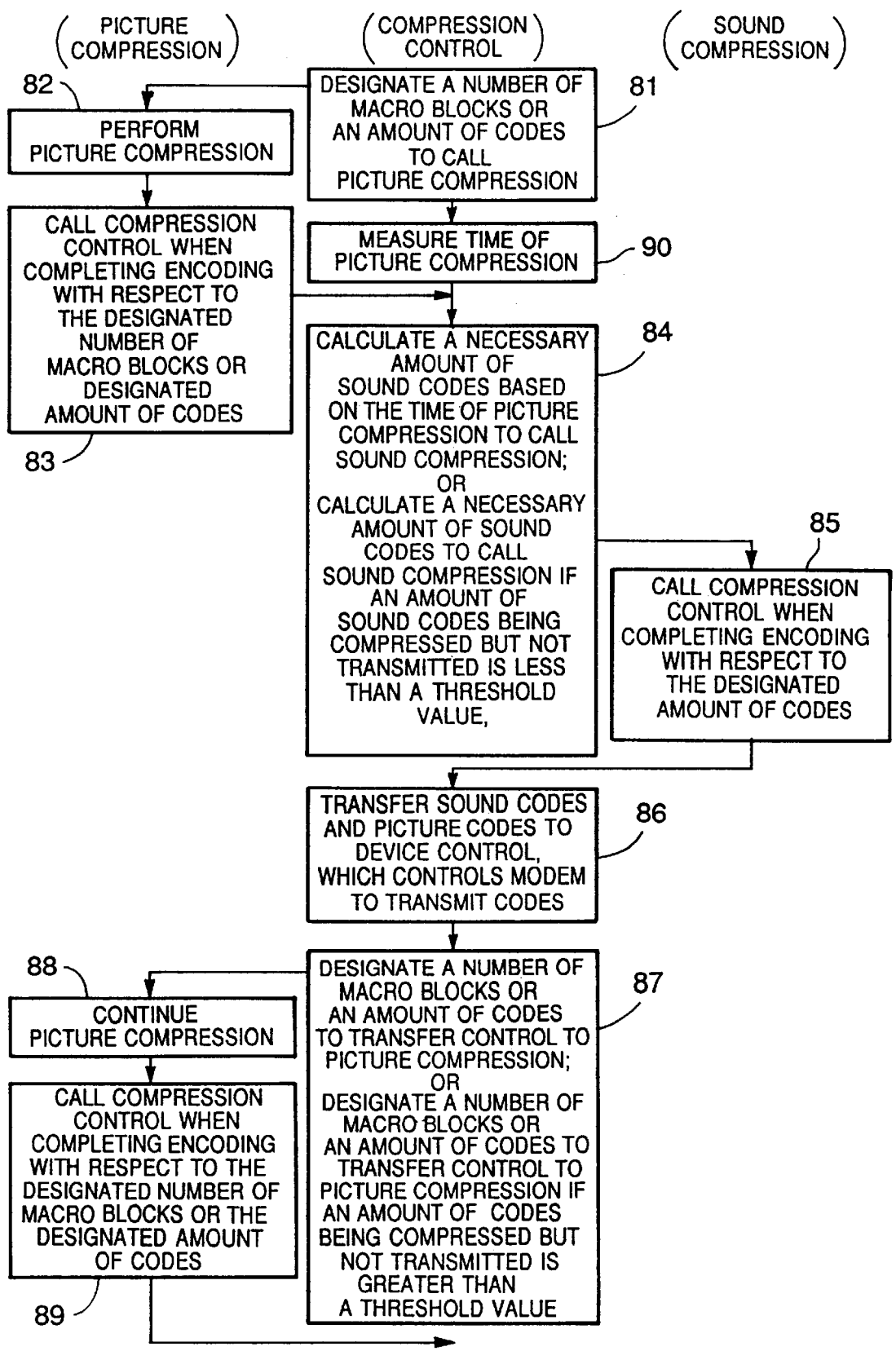

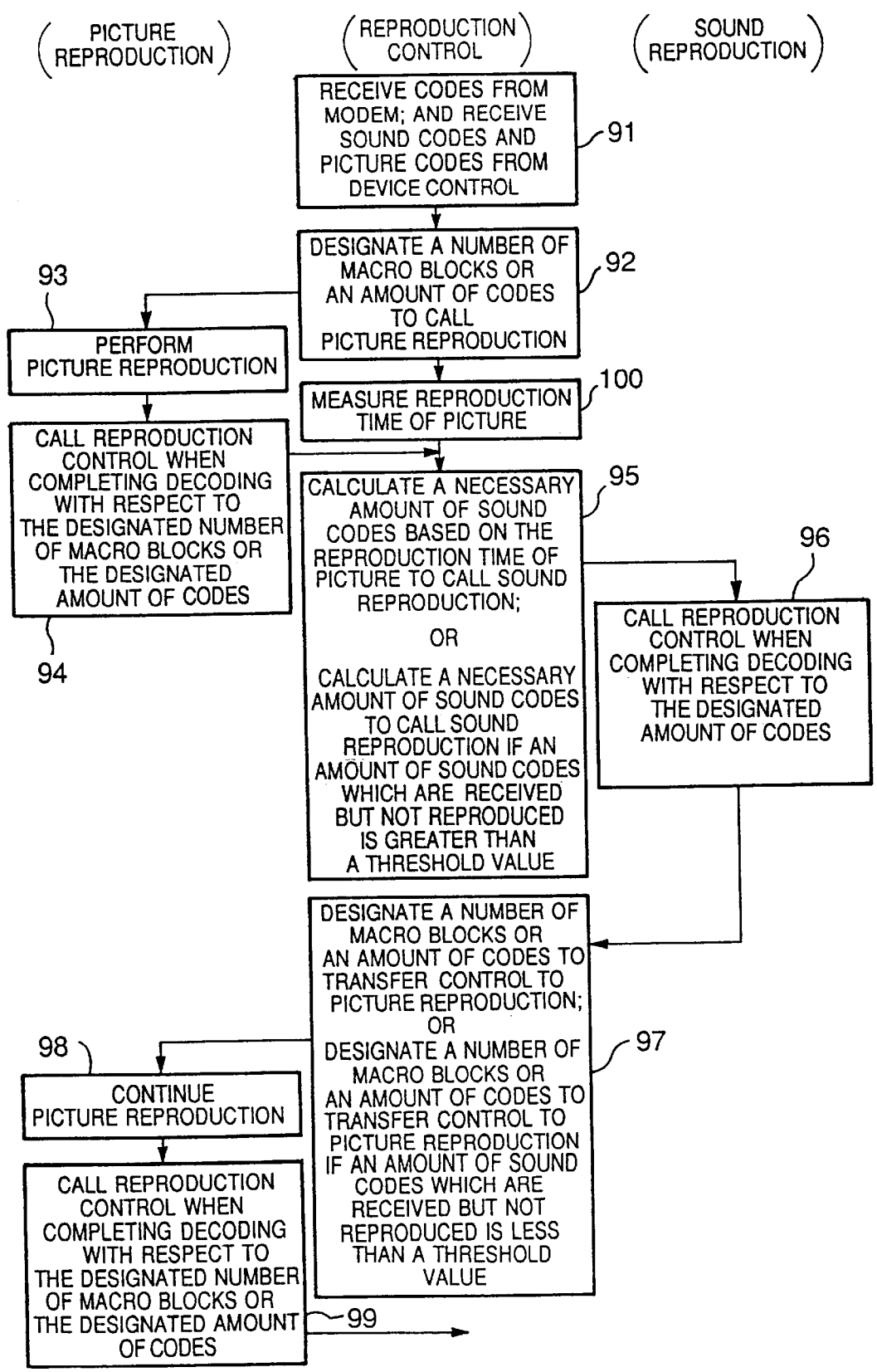

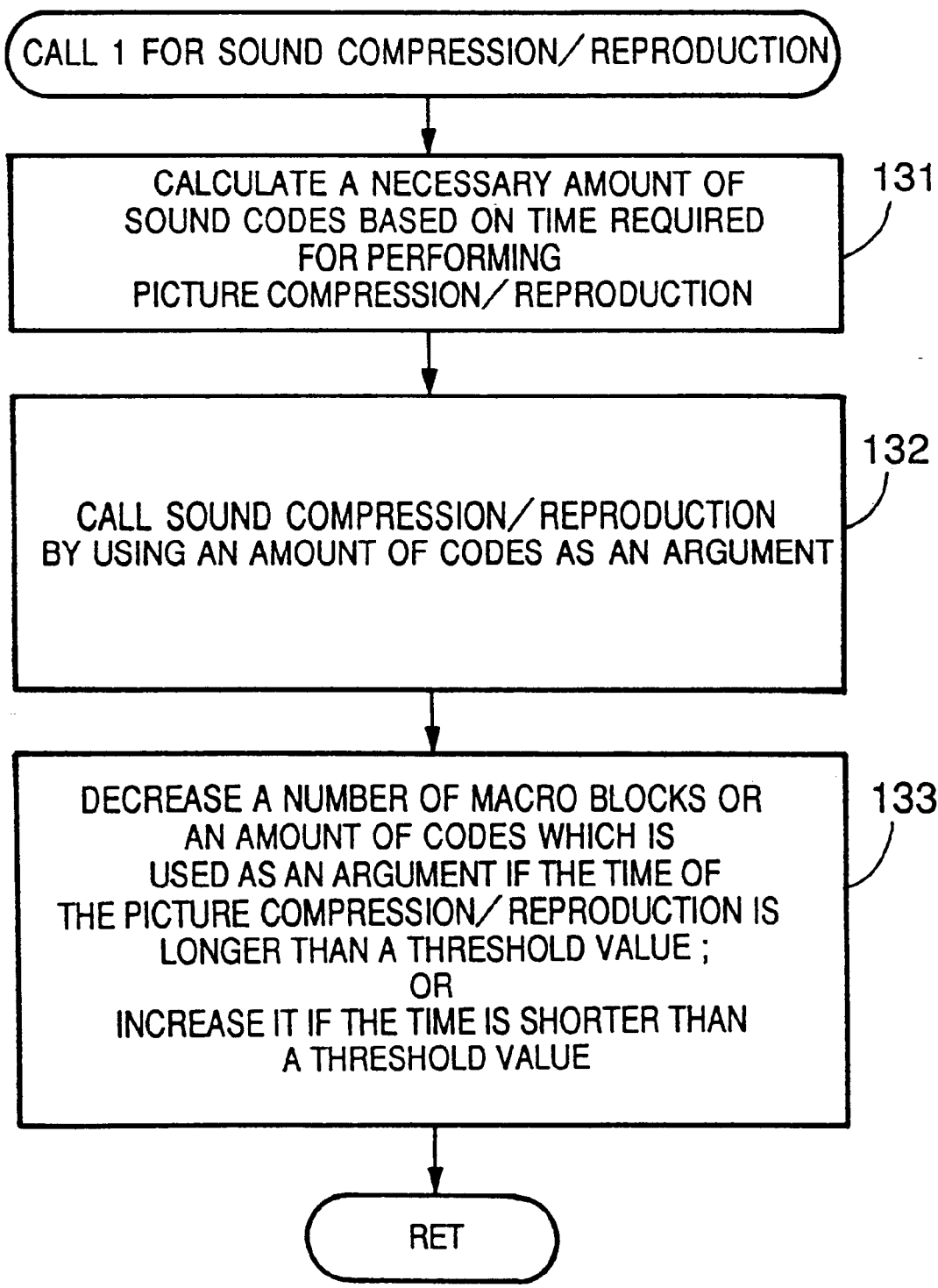

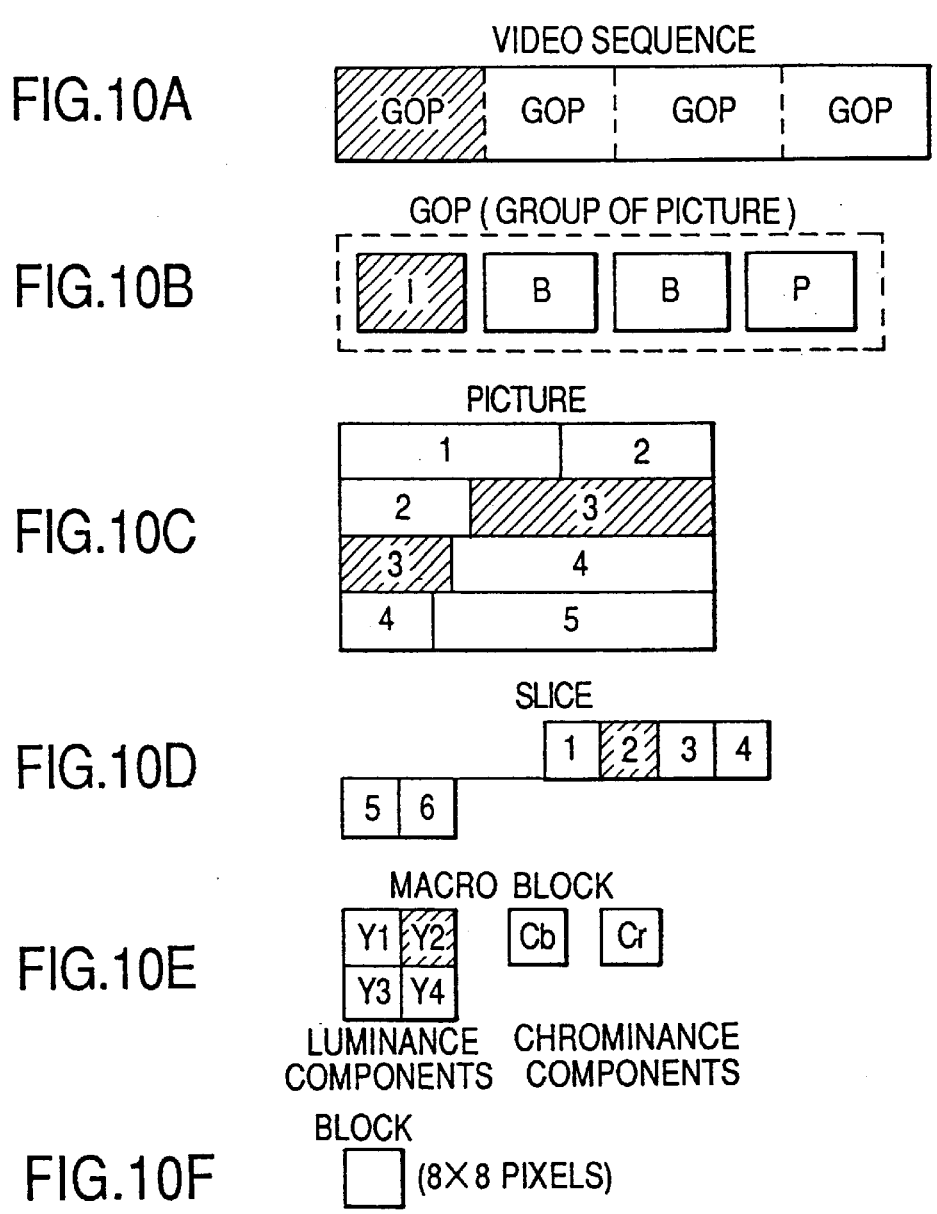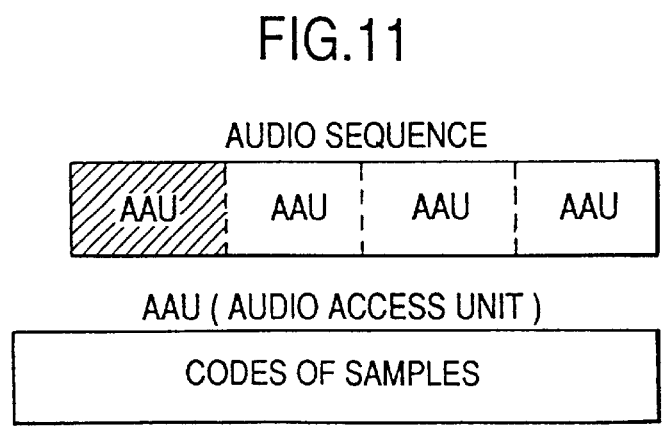

SOUND-PICTURE SYNCHRONOUS COMPRESSION AND SYNCHRONOUS REPRODUCTION SYSTEM

This application is a divisional of U.S. Ser. No. 09/022,540 filed Feb. 12, 1998, U.S. Pat. No. 6,104,756.

BACKGROUND OF THE INVENTION

1. Field of the Invention

This invention relates to sound-picture synchronous compression and synchronous reproduction systems in which sound information and picture information are subjected to synchronous compression and synchronous reproduction in a real-time manner. Specifically, the sound-picture synchronous compression and synchronous reproduction system (hereinafter, simply referred to as a sound-picture synchronous compression-reproduction system) is actualized using a sound-picture synchronous compression device and a sound-picture synchronous reproduction device. This invention is based on patent application No. Hei 9-27140 filed in Japan, the content of which is incorporated herein by reference.

2. Prior Art

The sound-picture synchronous compression-reproduction system is actualized by a pair of sound-picture synchronous compression device and sound-picture synchronous reproduction which use CPUs (an abbreviation for "Central Processing Unit") as well as DSPs (an abbreviation for "Digital Signal Processor"). In the sound-picture synchronous compression device, sound information and picture information are subjected to synchronous compression in real time. So, the compressed sound information and compressed picture information are transmitted via transmission lines to the sound-picture synchronous reproduction device, wherein they are subjected to synchronous reproduction in real time.

Normally, sounds and pictures are transmitted in a digitized manner via telephone lines and are then recorded on recording media by using compressive encoding because an amount of data thereof is enormous. The compression technique for the pictures frequently uses an encoding method designed on the basis of the DCT (an abbreviation for "Discrete Cosine Transform"), which uses a property that spatial frequencies of the pictures tend to be concentrated into low-frequency ranges. This encoding method is employed by the international standard, namely, MPEG (an abbreviation for "Motion Picture Experts Group") Video, recommendation H. 263.

In addition, the compression technique for the sounds frequently uses a so-called perception encoding method which omits inaudible information, which cannot be heard by human ears, by using auditory psychology. This encoding method is employed by the international standard, namely, MPEG Audio, recommendation G. 723.

FIG. 10A to FIG. 10F show hierarchy for encoding formats based on the standard of MPEG Video. Codes of the MPEG Video are assigned to levels of a hierarchical structure as shown in FIG. 10A to FIG. 10F. A top level of hierarchy corresponds to a video sequence which is configured by multiple GOPs (an abbreviation for "Group Of Picture"). Each GOP is configured by multiple pictures.

There are provided three kinds of pictures, namely, I picture, P picture and B picture. Herein, the I picture corresponds to intra-frame codes; the P picture corresponds to interframe codes with respect to a forward direction only; and the B picture correspond to interframe codes with respect to both of forward and backward directions. The picture consists of multiple slices corresponding to regions which are determined by partitioning an overall area of the picture. Each slice is configured by multiple macro blocks which are arranged from the right to the left or from the top to the bottom.

A block of 16×16 dots (or pixels) is divided into blocks of 8×8 dots, which are used for representation of luminance components (i.e., Y1, Y2, Y3 and Y4). In addition, blocks of 8×8 dots are used for representation of chrominance components (i.e., Cb, Cr) in connection with the region of the luminance components. Thus, the macro block is constructed by six blocks of 8×8 dots in total. Therefore, the block of 8×8 dots is used as a minimum unit for encoding.

FIG. 11 shows an example of the hierarchy for encoding formats based on the standard of MPEG Audio. Codes of the MPEG Audio are constructed using "AAU" (an abbreviation for "Audio Access Unit"), which is a minimum unit for encoding.

Now, a description will be given with respect to the conventional technique for compression of sound codes and picture codes. FIG. 12 is a block diagram showing an example of a sound-picture synchronous compression device which performs synchronous compression and transmission on sounds and pictures. In FIG. 12, a CPU 2 executes programs of a device control block 4 so as to control the device as a whole. A user operates a keyboard 3 to input commands and instructions to the device. States of execution of the programs are visually displayed on a screen of a display 1.

Picture data are taken by a camera 6 and are input to the device by means of a picture input block 5. Sound data are created by a microphone 8 and are input to the device by means of a sound input block 7. The sound data are subjected to compression by a sound compression block 10. The picture data are subjected to compression by a picture compression block 9. The compressed sound code corresponding to the compressed sound data as well as the compressed picture code corresponding to the compressed picture data are mixed together using a single code by a code nixing block 11. Then, mixed codes are transmitted onto a transmission line by a transmitter block 12 as well as a modem 13.

FIG. 13 is a block diagram showing an example of a sound-picture synchronous reproduction device which performs receiving and synchronous reproduction on sound-picture codes transmitted thereto. In FIG. 13, a CPU 22 executes programs of a device control block 24 to control the device as a whole. A user operates a keyboard 23 to input commands and instructions to the device. States of execution of the programs are visually displayed on a screen of a display 21.

A receiver block 32 receives mixed codes transmitted thereto from a modem 33 as sound codes and picture codes to be reproduced. Then, a code separation block 31 separates the mixed codes into sound codes and picture codes respectively. The sound codes are subjected to expansion (or reproduction) by a sound reproduction block 30. The picture codes are subjected to reproduction by a picture reproduction block 29. Then, contents of picture data corresponding to the reproduced picture codes are visually displayed on a screen of a monitor 26 by a picture output block 25. A sound output block 27 provides a speaker 28 with sound data corresponding to the reproduced sound codes. So, the speaker 28 produces the corresponding sounds.

The aforementioned example of the system for sound-picture compression and reproduction performs communications of codes. Herein, data processing should be performed in a real-time manner. In general, a number of operations (or calculations) are required in processing for the compression and reproduction. To enable real-time processing, the conventional system which uses the software for compression and reproduction of sounds and pictures reduces a number of frames representing pictures which are subjected to processing. Herein, parallel operation instructions of the CPU and DSP are used to perform multiple operations at once, so it is possible to accomplish high-speed performance in the above processing.

FIG. 14 shows an example of the parallel operation instructions. Herein, a 64-bit register R0 stores 4-word values a3, a2, a1 and a0, while a register R1 stores 4-word values b3, b2, b1 and b0. Those 4-word values are added together, so addition results are stored in the register R0. According to the parallel operation instructions described above, addition is performed with respect to four words at once, so it is possible to perform high-speed processing.

Functions of real-time OS (an abbreviation for "Operating System") can be used for the compression and reproduction of the sounds and pictures. Herein, if the sound processing and picture processing are switched over periodically by a certain period of time, it is possible to perform real-time processing with ease. At a time to switch over the processing, contents of the registers which are presently used should be retained. For this reason, the system performs processing in parallel, and implements the parallel operation instructions requiring "large-bits" registers each having a large number of bits. In that case, the switching of the large-bits registers frequently occurs, so it is impossible to perform high-speed processing. To avoid such a problem, it is necessary to add an additional process which initiates the switching of the processing between the sound compression and picture compression at the appropriate timing so that one of them is selectively performed.

It is possible to list some papers which disclose conventional examples of the system which relates to synchronous processing of the sound and picture.

For example, the paper of Japanese Patent Laid-Open Publication No. 7-64730 (denoted by "paper 1") discloses a conventional example of the system which processes sounds and pictures in a synchronized manner. The content of the paper 1 is summarized as follows:

A buffer memory is normally placed in a data accumulated state so that it is normally filled with a certain amount of data or more. A reproduction portion of one side always issues a data transfer request, so that data are transferred to reproduction portions of both sides by a unit of a data block.

The paper of Japanese Patent Laid-Open Publication No. 7-75059 (denoted by "paper 2") discloses a conventional example of the system, the content of which is summarized as follows:

The system checks a difference between a reproduction time of the sound and a reproduction time of the picture. If the sound is delayed from the picture in reproduction, a same screen image is continuously displayed. If the picture is delayed from the sound in reproduction, interpolation is performed with respect to the sound.

The paper of Japanese Patent Laid-Open Publication No. 7-110756 (denoted by "paper 3") discloses a conventional example of the system, the content of which is summarized as follows:

The system checks a time required for reproduction of one frame. Then, the system sets and processes a picture which should be displayed for a next frame. So, the system reproduces the sound accompanied with the picture.

The paper of Japanese Patent Laid-Open Publication No. 7-184143 discloses a conventional example of the system, the content of which is summarized as follows:

The processing of the system is controlled to be suited to the "long" processing whose processing period is long. Herein, after performing the long processing whose processing time is long, the system performs the "short" processing whose processing time is short multiple times by a constant period of time.

The aforementioned examples of the sound-picture synchronous compression-reproduction system may have a large interval of time for switching over the sound processing and picture processing. In such a case, the system cannot catch up with the timing of execution of the sound processing. In the case where the sound and picture operate in parallel, an overhead for switching over the sound processing and picture processing becomes large. For this reason, the conventional system suffers from a problem that it cannot catch up with the timing of execution of the sound processing, so the reproduction breaks off. In the case where adjustment is performed on the switching timing between the sound processing and picture processing in response to the performance of the CPU and DSP as well as the transmission speed of the communication lines, it is necessary to modify the system with respect to the sound processing and picture processing. In that case, there is a problem that adjustments of the programs take much time.

SUMMARY OF THE INVENTION

It is an object of the invention to provide a sound-picture synchronous compression-reproduction system which is capable of reducing an overhead at the switching of parallel operation registers and which is also capable of realizing the switching of the sound processing by an interval of time in such a way that the sound processing does not break off.

It is another object of the invention to provide a sound-picture synchronous compression-reproduction system which is capable of adjusting the switching timing between the sound processing and picture processing without a substantial modification of programs used for compression and reproduction of the sound and picture.

According to an aspect of the invention, the sound-picture synchronous compression-reproduction system is actualized by a sound-picture synchronous compression device and a sound-picture synchronous reproduction device.

In the sound-picture synchronous compression device, the picture compression process is performed on a designated amount of picture codes. Then, a necessary amount of sound codes is calculated on the basis of a time of the picture compression process and is subjected to sound compression process. Herein, if an untransmitted amount of compressed sound codes is less than a threshold value, the device calculates an amount of sound codes for sound compression by which an amount of the untransmitted compressed sound codes are made greater than the threshold value. Thus, the calculated amount of sound codes is subjected to sound compression process. So, compressed picture codes and compressed sound codes are transmitted to the sound-picture synchronous reproduction device.

In the sound-picture synchronous reproduction device, the picture reproduction process is performed on a designated amount of the compressed picture codes. Then, a necessary amount of the compressed sound codes is calculated on the basis of a time of the picture reproduction process and is subjected to sound reproduction process. Herein, if an unreproduced amount of the compressed sound codes is greater than a threshold value, the device calculates an amount of compressed sound codes for sound reproduction by which an amount of the compressed sound codes received are made less than the threshold value. So, the calculated amount of the compressed sound codes is subjected to sound reproduction process. Thus, the device reproduces the picture codes and sound codes, based on which pictures and sounds are output by the monitor and speaker respectively.

Incidentally, the picture codes correspond to a number of macro blocks while the sound codes correspond to a number of AAUs.

BRIEF DESCRIPTION OF THE DRAWINGS

These and other objects of the subject invention will become more fully apparent as the following description is read in light of the attached drawings wherein:

FIG. 3 is a flowchart showing a flow of steps which are performed in connection with the device of FIG. 1;

FIG. 4 is a flowchart showing a flow of steps which are performed in connection with the device of FIG. 2;

FIG. 9A is a flowchart showing a subroutine for call 1 of the sound compression/reproduction;

FIGS. 10A, 10B, 10C, 10D, 10E and 10F show an example of hierarchy for code formats based on the MPEG Video;

FIG. 11 shows an example of hierarchy for code formats based on the MPEG Audio;

DESCRIPTION OF THE PREFERRED EMBODIMENT

Figure 1:
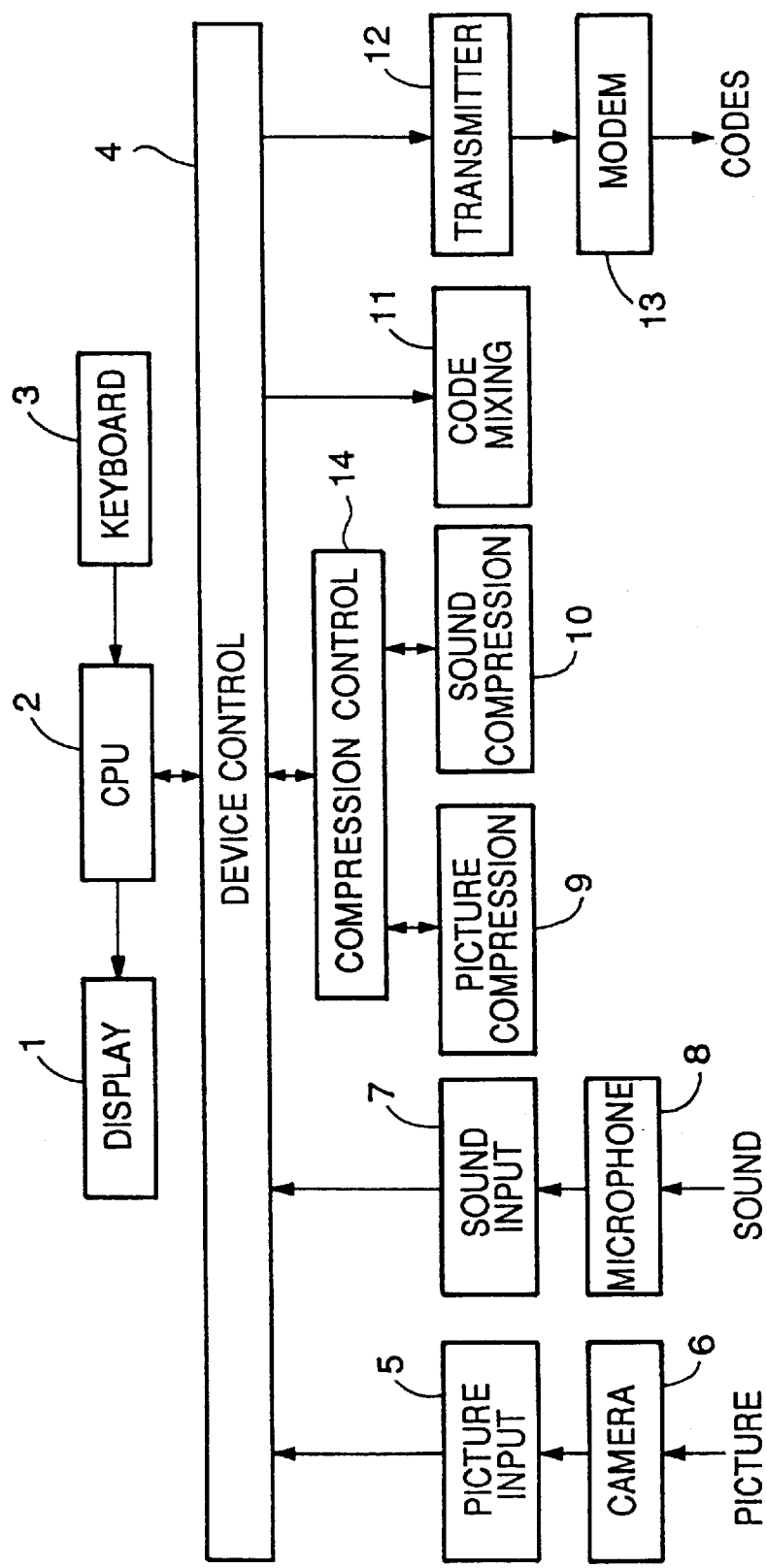
FIG. 1 is a block diagram showing a configuration of a sound-picture synchronous compression device in accordance with the embodiment of the invention.
Figure 12:
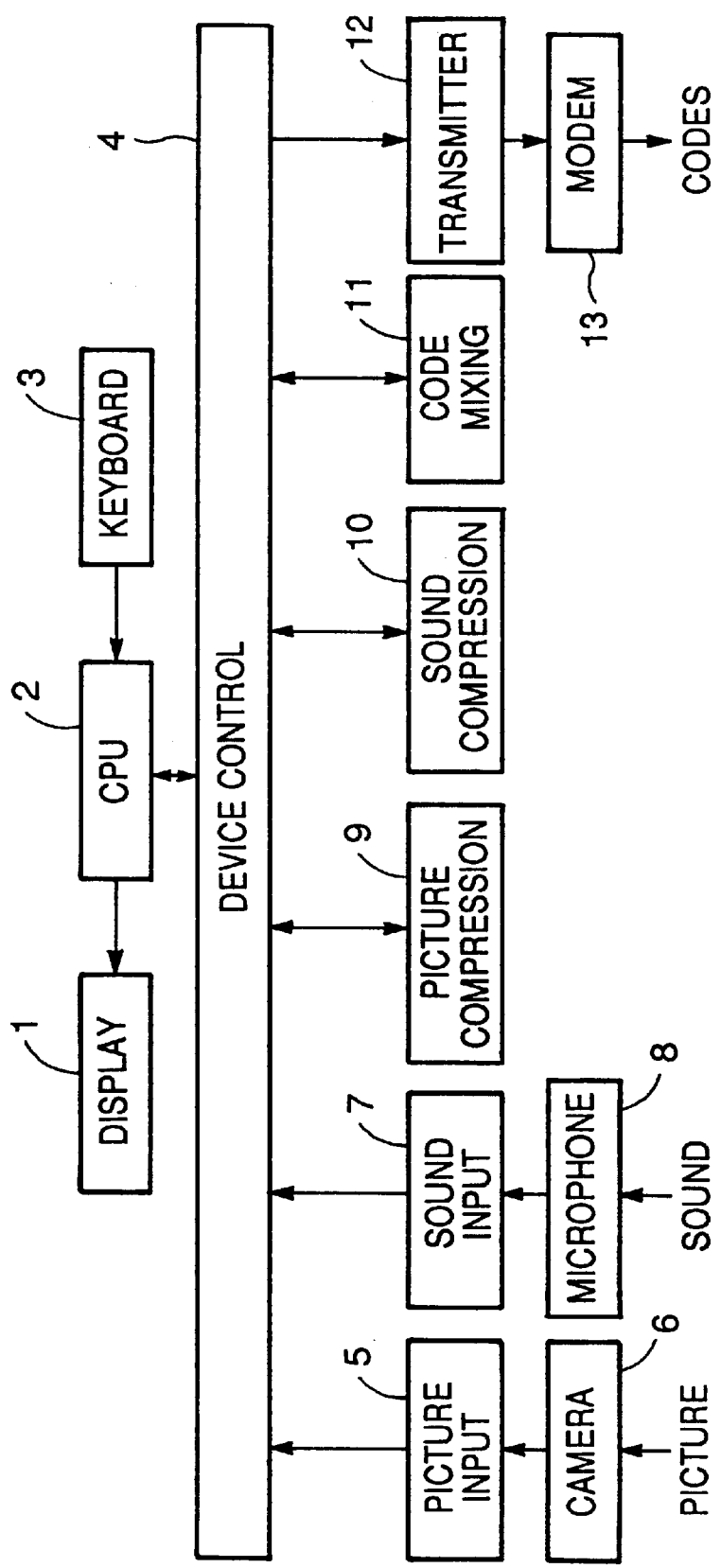
FIG. 12 is a block diagram showing an example of the sound-picture synchronous compression device.

FIG. 1 shows a configuration of a sound-picture synchronous compression device in accordance with the embodiment of the invention, wherein parts equivalent to those of FIG. 12 are designated by the same numerals.

Like the aforementioned device of FIG. 12, the device of FIG. 1 is configured by the device control block 4 for controlling the device as a whole, the CPU 2 for executing programs, the keyboard 3 for inputting commands and instructions given by the user, and the display 1 for visually displaying states of execution of the programs. In addition, the device of FIG. 1 contains the camera 6 and the picture input block 5 which are used to input pictures as well as the microphone 8 and the sound input block 7 which are used to input sounds. Further, the device contains the picture compression block 9 for compressing pictures, the sound compression block 10 for compressing sounds, and the code mixing block 11 for mixing sound codes and picture codes as well as the transmitter block 12 and the modem 13 which are used to perform transmission of codes. In addition to the aforementioned blocks 1 to 13, the device of FIG. 1 further contains a compression control block 14 which controls switching between picture compression and sound compression.

The sound-picture synchronous compression device of FIG. 1 inputs picture data by means of the picture input block 5 and the camera 6. In addition, the device inputs sound data by means of the sound input block 7 and the microphone 8. The compression control block 14 switches over execution of the picture compression block 9 and execution of the sound compression block 10, so that the picture data and sound data are subjected to compression respectively. Thus, the picture compression block 9 produces compressed picture codes, while the sound compression block 10 produces compressed sound codes. The compressed picture code and compressed sound code are mixed together in a form of a single code by the code mixing block 11. Then, the mixed codes are subjected to transmission by means of the transmitter block 12 and the modem 13.

Figure 2:
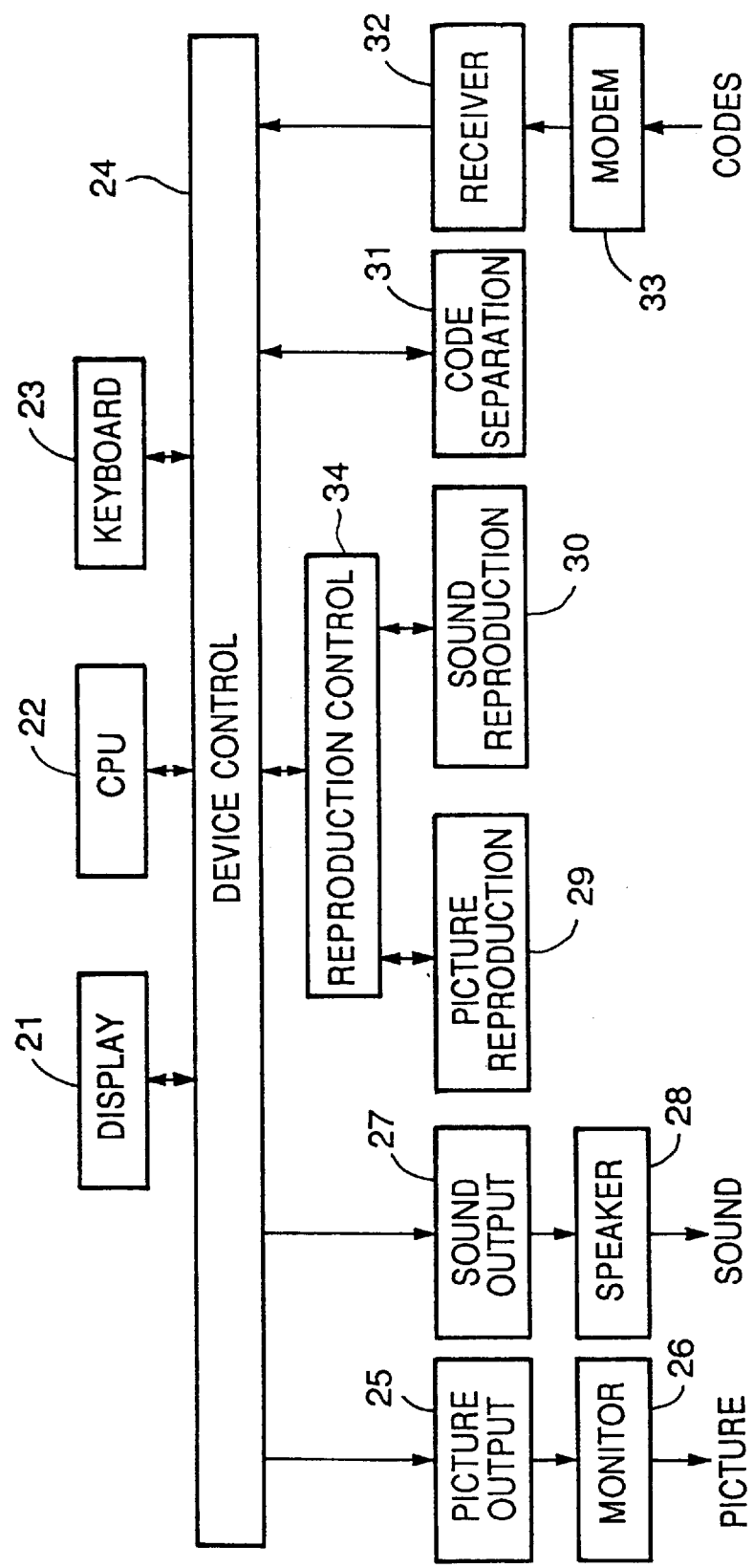
FIG. 2 is a block diagram showing a configuration of a sound-picture synchronous reproduction device in accordance with the embodiment of the invention.
Figure 13:
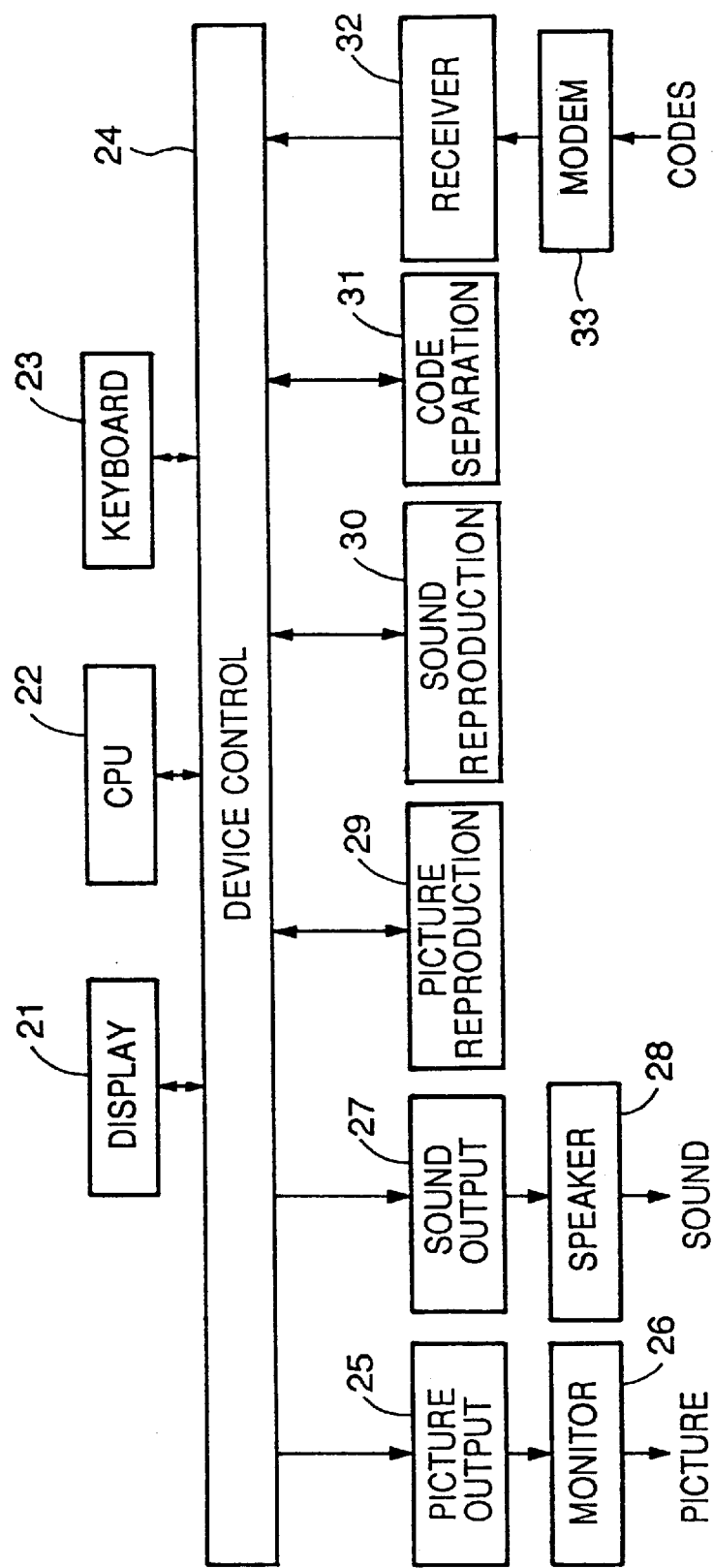
FIG. 13 is a block diagram showing an example of the sound-picture synchronous reproduction device.
Figure 14:
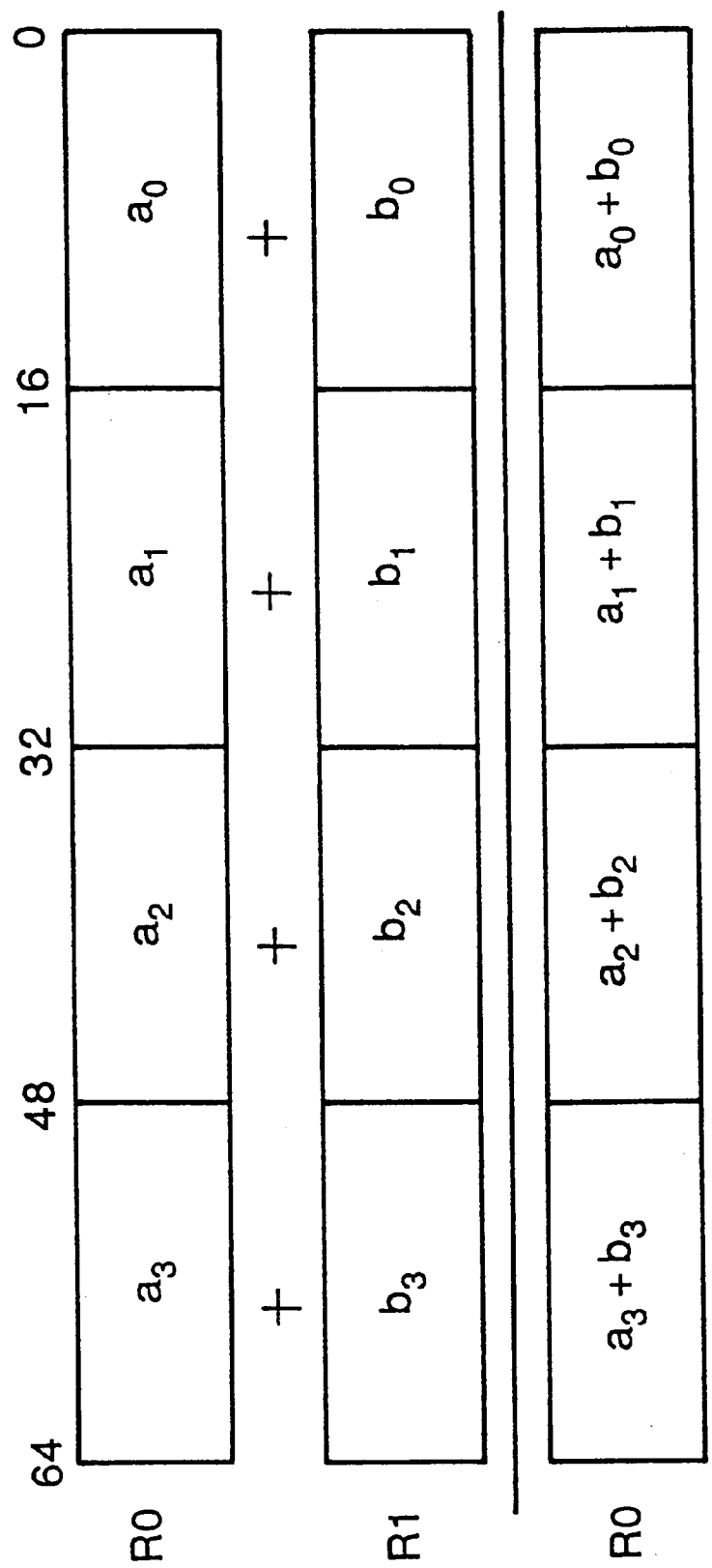
FIG. 14 shows an example of parallel operation instructions.

FIG. 2 shows a configuration of a sound-picture synchronous reproduction device in accordance with the embodiment of the invention, wherein parts equivalent to those of FIG. 13 are designated by the same numerals. The sound-picture synchronous reproduction device of FIG. 2 is configured by the device control block 24 for controlling the device as a whole, the CPU 22 for executing programs, the keyboard 23 for inputting commands and instructions given by the user, and the display 21 for visually displaying states of execution of the programs. In addition, the device contains the picture output block 25 and the monitor 26 which are used to output pictures as well as the sound output block 27 and the speaker 28 which are used to output sounds. Further, the device contains the picture reproduction block 29 for reproducing pictures, the sound reproduction block 30 for reproducing sounds, and the code separation block 31 for separating the mixed codes into sound codes and picture codes as well as the receiver block 32 and the modem 33 which are used to receive the mixed codes transmitted thereto. In addition to the aforementioned blocks 21 to 33, the device of FIG. 2 further contains a reproduction control block 34 which controls switching between picture reproduction and sound reproduction.

The sound-picture synchronous reproduction device of FIG. 2 receives the mixed codes by means of the receiver block 32 and the modem 33 as sound codes and picture codes which should be reproduced. So, the code separation block 31 separates the mixed codes into the sound codes and picture codes. The reproduction control block 34 switches over execution of the picture reproduction block 29 and execution of the sound reproduction block 30, so that the picture codes and sound codes are subjected to reproduction respectively. Thus, picture data corresponding to the reproduced picture codes are output by means of the picture output block 25 and the monitor 26, while the sound data corresponding to the reproduced sound codes are output by means of the sound output block 27 and the speaker 28.

Next, a description will be given with respect to operations of the present embodiment. FIG. 3 shows a sequence of operations for the sound compression and picture compression. Steps of FIG. 3 are classified into three kinds of processing which correspond to the compression control, picture compression and sound compression respectively. So, the steps are arranged in different columns of FIG. 3 respectively.

In step 81 which belongs to the processing of the compression control, the compression control block 14 designates a number of macro blocks or an amount of data (or codes) to call the picture compression block 9. Herein, the designated number of the macro blocks and the designated amount of the codes are preset values, which are set in advance in such a way that the sound and picture synchronize with each other without causing a break-off event in the sound compression. The preset values depend on the system currently used. For example, the preset value can be determined using the unit of line(s).

After leaving the step 81, the system of the present embodiment proceeds to step 82, wherein the picture compression block 9 performs picture compression on input picture data. In next step 83, when completing the compressive encoding with respect to the designated number of macro blocks or the designated amount of codes, the picture compression block 9 calls the compression control block 14. The compression control block 14 measures a time of the picture compression in step 90. So, in step 84, the compression control block 14 calculates a necessary amount of sound codes based on the measured time of the picture compression so as to call the sound compression block 10. Or, if an amount of sound codes which are compressed but are not subjected to transmission is less than a threshold value, the compression control block 14 calculates a necessary amount of sound codes to call the sound compression block 10.

As described above, the step 84 contains two processes which are connected by "OR". Next, a description will be given with respect to the basis of calculations for the necessary amount of sound codes in the latter process described after "OR" in step 84.

In some case, sound data have been already compressed but remain in a transmission buffer (not shown) of the transmitter block 12 as untransmitted codes. In such a case, if the system makes a decision that an amount of the untransmitted codes is less than a prescribed threshold value, it can be assumed that the device has a room for additional transmission. Therefore, it is possible to conduct a further accumulation of sound codes in the transmission buffer up to a certain value of accumulation which is greater than the threshold value. Therefore, the device performs calculations to produce an amount of sound codes which can be further accumulated to fill up the transmission buffer up to the certain value of accumulation greater than the threshold value. Therefore, in step 84, the compression control block 14 instructs the sound compression block 10 to perform sound compression with respect to the calculated amount of sound codes.

After leaving the step 84, the system proceeds to step 85 which belongs to the processing of the sound compression. In step 85, when completing compressive encoding with respect to the necessary amount of sound codes which is designated by the sound compression block 10, the sound compression block 10 calls the compression control block 14. So, the system proceeds to step 86 belonging to the processing of the compression control. In step 86, the compression control block 14 transfers the sound codes and picture codes to the device control block 4, which in turn controls the modem 13 to engage transmission of codes. In next step 87, the compression control block 14 designates a number of macro blocks or an amount of codes so as to transfer control to the picture compression block 9. Or, if an amount of sound codes which are compressed but are not subjected to transmission is greater than a threshold value, the compression control block 14 designates a number of macro blocks or an amount of codes so as to transfer control to the picture compression block 9. So, the system proceeds to step 88 belonging to the processing of the picture compression. In step 88, the picture compression block 9 continues the picture compression. In step 89, when completing compressive encoding with respect to the designated number of macro blocks or designated amount of codes, the picture compression block 9 calls the compression control block 14.

According to the operations of the sound-picture synchronous compression device of the present embodiment, every time the encoding is performed with respect to a certain region of the picture, a decision is made as to whether the sound compression is performed or not, so that only the "necessary" sound compression is performed. Thus, it is possible to perform the sound compression and picture compression at a high speed without causing a break-off event of the sound compression.

FIG. 4 shows a sequence of operations of the sound-picture synchronous reproduction device of FIG. 2. Steps of FIG. 4 are classified into three kinds of processing which correspond to the picture reproduction, reproduction control and sound reproduction. So, the steps are arranged in different columns of FIG. 4 respectively.

At first, the modem 33 receives codes transmitted thereto, so that the reproduction control block 34 receives sound codes and picture codes from the device control block 24 in step 91. In step 92, the reproduction control block 34 designates a (prescribed) number of macro blocks or an (prescribed) amount of codes to call the picture reproduction block 29. Thus, the system proceeds to step 93 which belongs to the processing of the picture reproduction. In step 93, the picture reproduction block 29 performs the picture reproduction. In next step 94, when completing decoding of the picture codes with respect to the designated number of macro blocks or the designated amount of codes, the picture reproduction block 29 calls the reproduction control block 34. So, the system proceeds to step 95 which belongs to the processing of the reproduction control.

After leaving the step 92, the reproduction control block 34 measures a reproduction time of the picture in step 100. Then, the system proceeds to step 95. In step 95, the reproduction control block 34 calculates a necessary amount of sound codes based on the reproduction time of the picture so as to call the sound reproduction block 30. Or, if an amount of sound codes which are received but are not reproduced is greater than a threshold value, the reproduction control block 34 calculates a necessary amount of sound codes so as to call the sound reproduction block 30.

As described above, the step 95 contains two processes which are connected by "OR". Next, a description will be given with respect to the basis of calculations for the necessary amount of sound codes in the latter process described after "OR" in step 95. In some case, a certain amount of sound codes are received but are accumulated in a receiving buffer (not shown) of the receiver block 32 without being subjected to reproduction. If such an amount of "unreproduced" sound codes is greater than a prescribed threshold value, it should be reduced to be less than the threshold value. So, the reproduction control block 34 calculates an amount of sound codes being read from the receiving buffer, by which the amount of unreproduced sound codes is reduced to be less than the threshold value. Therefore, the reproduction control block 34 instructs the sound reproduction block 30 to perform sound reproduction with respect to the calculated amount of sound codes in step 95.

After leaving the step 95, the system proceeds to step 96 which belongs to the processing of the sound reproduction. In step 96, the sound reproduction block 30 performs decoding with respect to the designated amount of sound codes which is designated by the reproduction control block 34; then, the sound reproduction block 30 calls the reproduction control block 34. Next, the system proceeds to step 97 which belongs to the processing of the reproduction control. In step 97, the reproduction control block 34 designates a number of macro blocks or an amount of codes so as to transfer control to the picture reproduction block 29. Or, if an amount of sound codes which are received but are not reproduced is less than a threshold value, the reproduction control block 34 designates a number of macro blocks or an amount of codes so as to transfer control to the picture reproduction block 29. So, the system proceeds to step 98 which belongs to the processing of the picture reproduction. In step 98, the picture reproduction block 29 continues the picture reproduction. In next step 99, when completing decoding with respect to the designated number of macro blocks or the designated amount of codes, the picture reproduction block 29 calls the reproduction control block 34.

According to the aforementioned operations of the sound-picture synchronous reproduction device of the present embodiment, every time the decoding is performed with respect to a certain region of the picture, a decision is made as to whether to perform the sound reproduction or not, so that only the "necessary" sound reproduction is performed. Thus, it is possible to perform the sound reproduction and picture reproduction at a high speed without causing a break-off event in the sound reproduction.

Next, a description will be given with respect to details of the operations of the sound-picture synchronous compression-reproduction system in accordance with the embodiment of the invention. Herein, the operations of the system are described using flowcharts showing a variety of routines (or programs). Actually, different routines should be provided for compression and reproduction respectively with respect to each of the sound and picture. In the present specification, some routines are combined together as a single routine to avoid overlapping of the description. As a result, the flowcharts are provided for routines representing the compression/reproduction control, picture compression/reproduction and sound compression/reproduction as well as call subroutines, wherein a slash "/" represents "or" so that the compression/reproduction control can be interpreted as the compression control or reproduction control, for example.

For convenience' sake, the description of the flowcharts is made in such a way that steps of each routine are performed by a unit having a certain name corresponding to its function. For example, the routine of FIG. 5A is executed by a "compression/reproduction control" unit which corresponds to the aforementioned compression control block or reproduction control block.

Figure 5A:
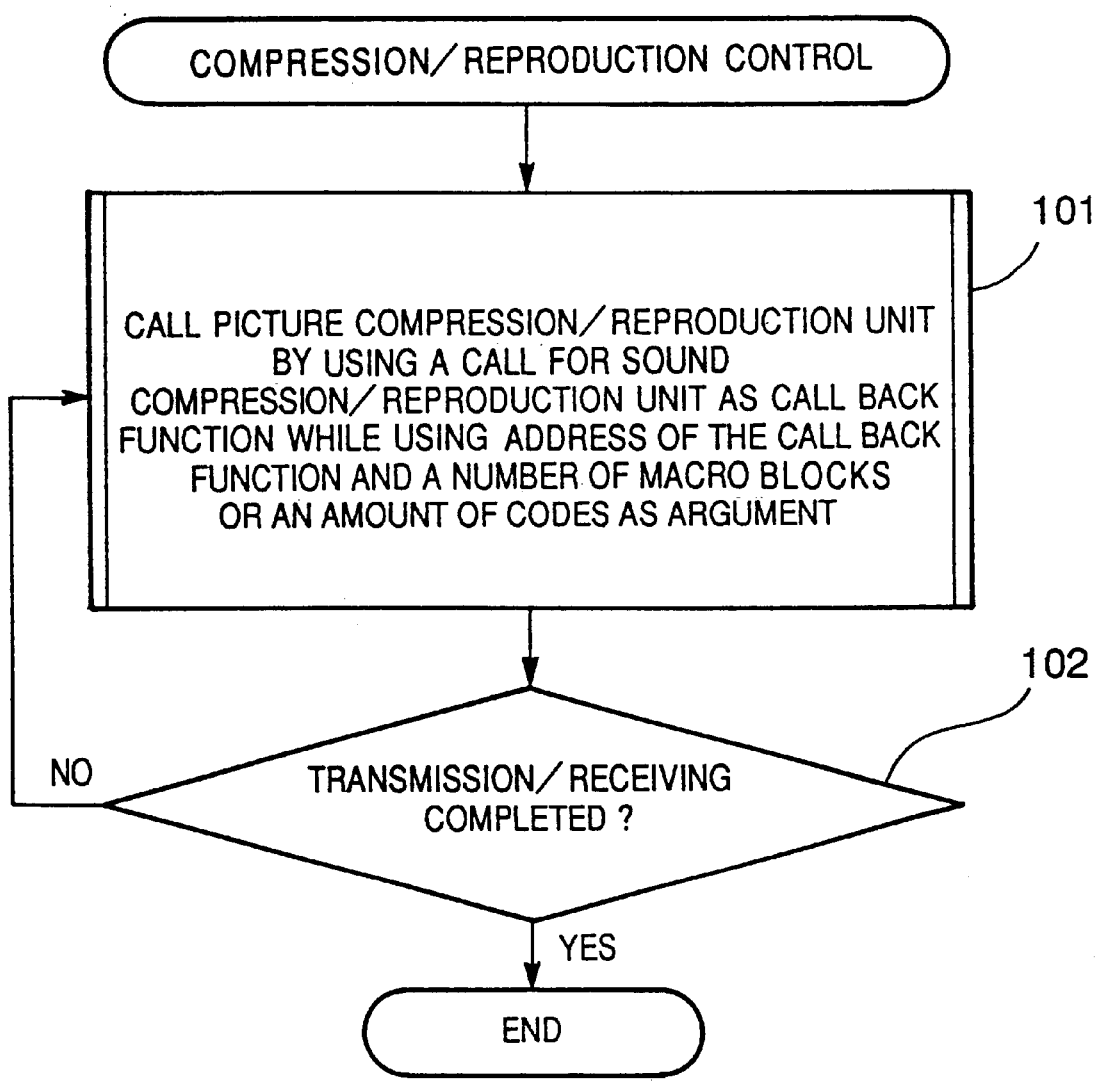
FIG. 5A is a flowchart showing a routine of compression/reproduction control.
Figure 5B:
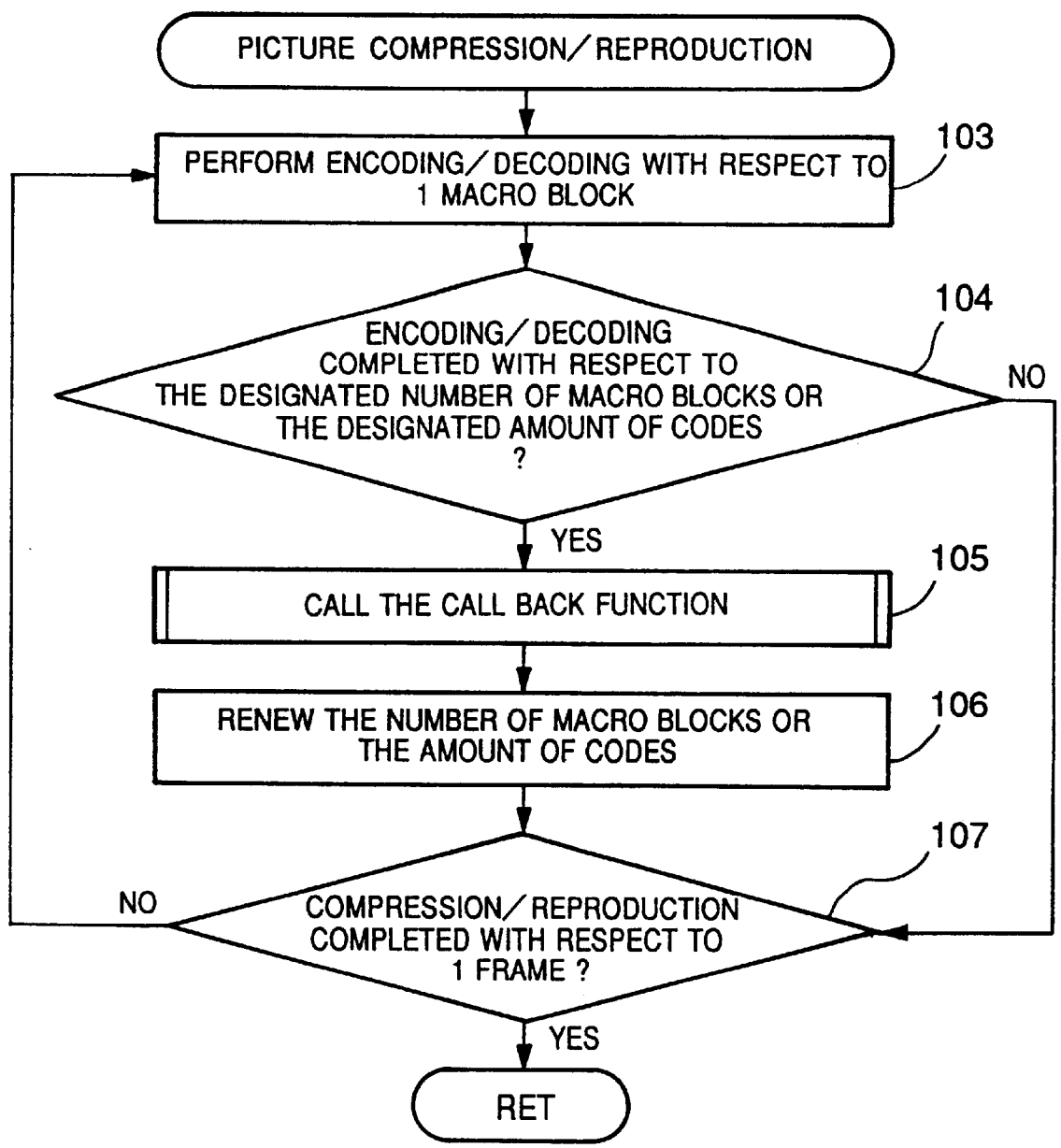
FIG. 5B is a flowchart showing a routine of picture compression/reproduction.

The routines of FIG. 5A and FIG. 5B are designed to switch over the picture processing and sound processing by using the call back function which corresponds to an address of a called subroutine. Herein, the calling side transfers the address to call the subroutine, in which the call back function is called based on the address.

FIG. 5A shows a flow of steps with respect to the routine of the compression/reproduction control. In step 101, the compression/reproduction control unit uses a call for a sound compression/reproduction unit as a call back function while using an address of the call back function and a number of macro blocks or an amount of codes as an argument. Using the call back function as well as the argument, the compression/reproduction control unit calls a picture compression/reproduction unit (which corresponds to the aforementioned picture compression block or picture reproduction block). In step 102, a decision is made as to whether the transmission/receiving operation (i.e., transmission operation or receiving operation) is completed or not. If the transmission/receiving operation is completed, the system ends execution of the routine of the compression/reproduction control shown in FIG. 5A. If not, the system proceeds back to the step 101.

FIG. 5B shows a flow of steps with respect to the routine of the picture compression/reproduction. In step 103, the picture compression/reproduction unit performs the encoding/decoding operation (i.e., encoding operation or decoding operation) with respect to one macro block. In step 104, a decision is made as to whether the picture compression/reproduction unit has completed the encoding/decoding operation with respect to the designated number of macro blocks or the designated amount of codes or not. If the picture compression/reproduction unit has not completed the above encoding/decoding operation, the picture compression/reproduction unit proceeds to step 107. Otherwise, the picture compression/reproduction unit proceeds to step 105 to call the call back function. In step 106, the picture compression/reproduction unit renews the number of macro blocks or the amount of codes. In step 107, a decision is made as to whether the picture compression/reproduction unit has completed the compression/reproduction operation (i.e., compression operation or reproduction operation) with respect to one frame. If the unit has completed the above compression/reproduction operation, the picture compression/reproduction unit reverts control to the original calling side (i.e., compression/reproduction control unit). If not, the picture compression/reproduction unit proceeds back to the step 103.

Figure 6:
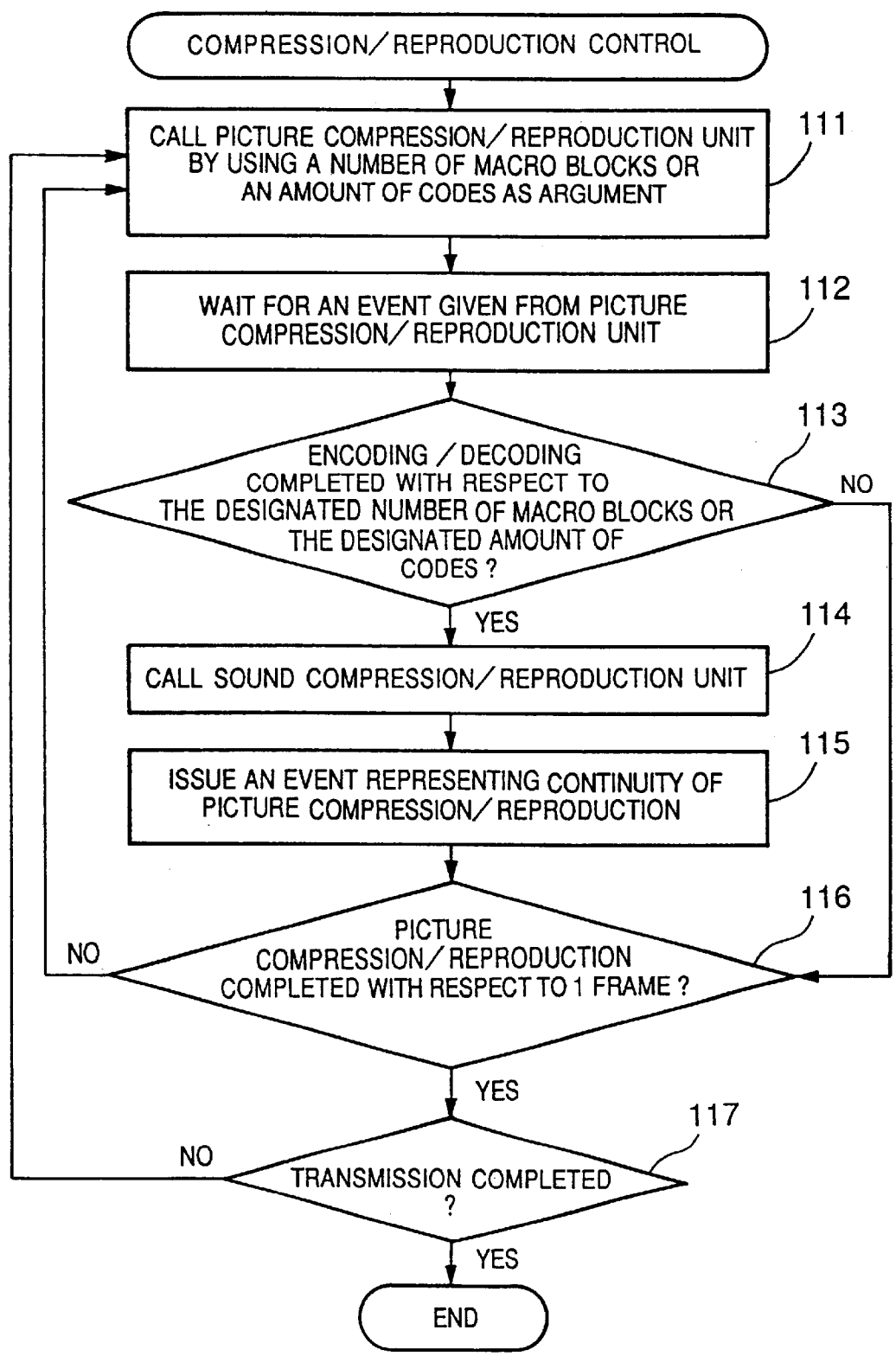
FIG. 6 is a flowchart showing a routine of compression/reproduction control.
Figure 7:
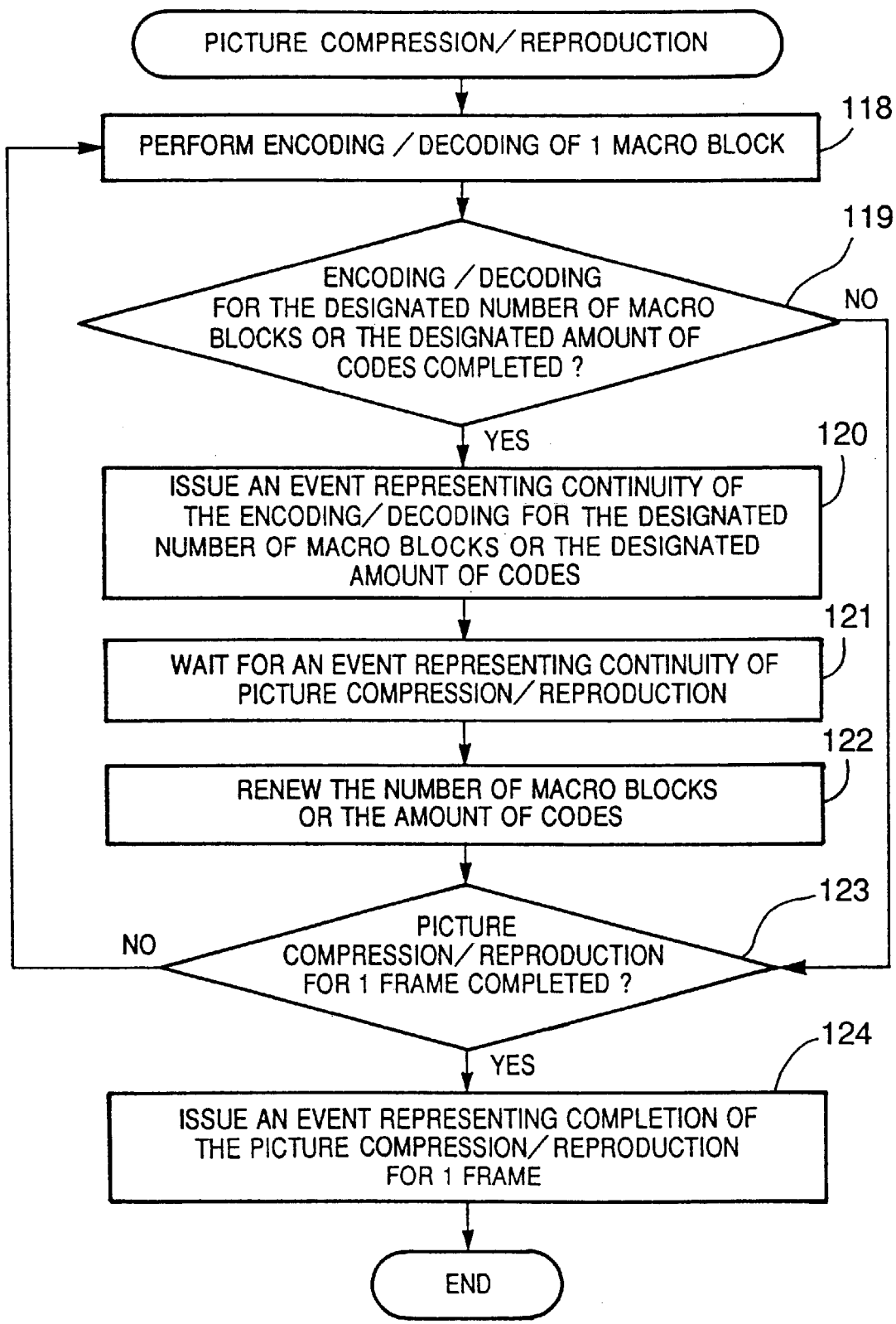
FIG. 7 is a flowchart showing a routine of picture compression reproduction.

In the case of FIG. 6 and FIG. 7, the system switches over the picture processing and sound processing by stopping the processing until the issuance of an event which corresponds to a synchronization control signal of the real-time parallel processing.

FIG. 6 shows a flow of steps with respect to the routine of the compression/reproduction control. In step 111, the compression/reproduction control unit uses (or designates) a number of macro blocks or an amount of codes as an argument to call the picture compression/reproduction unit. In step 112, the compression/reproduction control unit waits for occurrence of an event given from the picture compression/reproduction unit.

In step 113, a decision is made as to whether the event represents completion of the encoding/decoding operation with respect to the designated number of macro blocks or the designated amount of codes. If the event represents the completion of the above encoding/decoding operation, the compression/reproduction control unit proceeds to step 114 to call the sound compression/reproduction unit which corresponds to the aforementioned sound compression block or sound reproduction block. If not, the compression/reproduction control unit proceeds directly to step 116. After leaving the step 114, the compression/reproduction control unit proceeds to step 115 so as to issue an event representing continuity of the picture compression/reproduction.

In step 116, a decision is made as to whether the event represents completion of the picture compression/reproduction with respect to one frame. If the event represents the completion of the above picture compression/reproduction, the compression/reproduction control unit proceeds to step 117 to make a decision as to whether transmission of codes is completed or not. If not, the compression/reproduction control unit proceeds back to the step 111. If the transmission of the codes is not completed, the compression/reproduction control unit leaves the step 117 to proceed back to the step 111. If the transmission of the codes is completed, the compression/reproduction control unit ends execution of the routine shown in FIG. 6.

FIG. 7 shows a routine of the picture compression/reproduction. In step 118, the picture compression/reproduction unit performs encoding/decoding operation with respect to one macro block. In step 119, a decision is made as to whether the encoding/decoding operation has been completed with respect to the designated number of macro blocks or the designated amount of codes. If the picture compression/reproduction unit has completed the above encoding/decoding operation, the picture compression/reproduction unit proceeds to step 120 to issue an event representing completion of the encoding/decoding operation. If not, the picture compression/reproduction unit proceeds directly to step 123. After leaving the step 119, the picture compression/reproduction unit proceeds to step 121 to wait for an event representing continuity of the picture compression/reproduction. In step 122, the picture compression/reproduction unit renews the number of macro blocks or the amount of codes.

In step 123, a decision is made as to whether the picture compression/reproduction has completed with respect to one frame or not. If not, the picture compression/reproduction unit leaves the step 123 to proceed back to the step 118. If the above picture compression/reproduction has been completed, the picture compression/reproduction unit proceeds to step 124 to issue an event representing completion of the picture compression/reproduction. Then, the picture compression/reproduction unit ends execution of the routine of FIG. 7.

Figure 8:
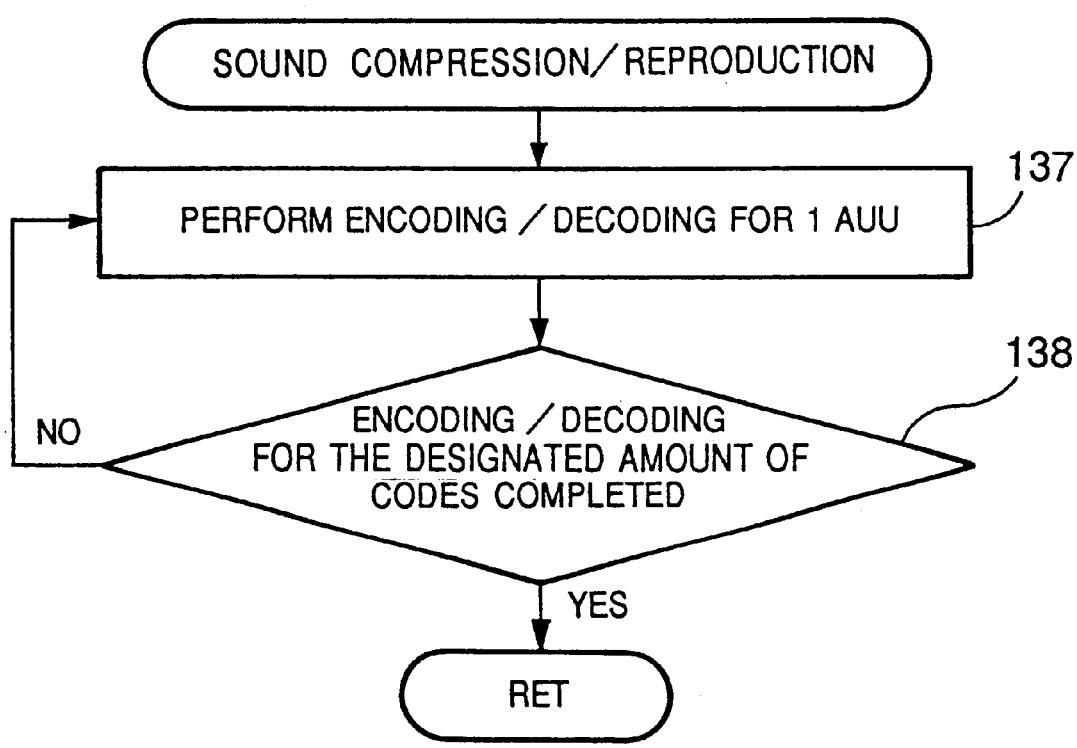
FIG. 8 is a flowchart showing a subroutine of sound compression/reproduction.
Figure 9B:
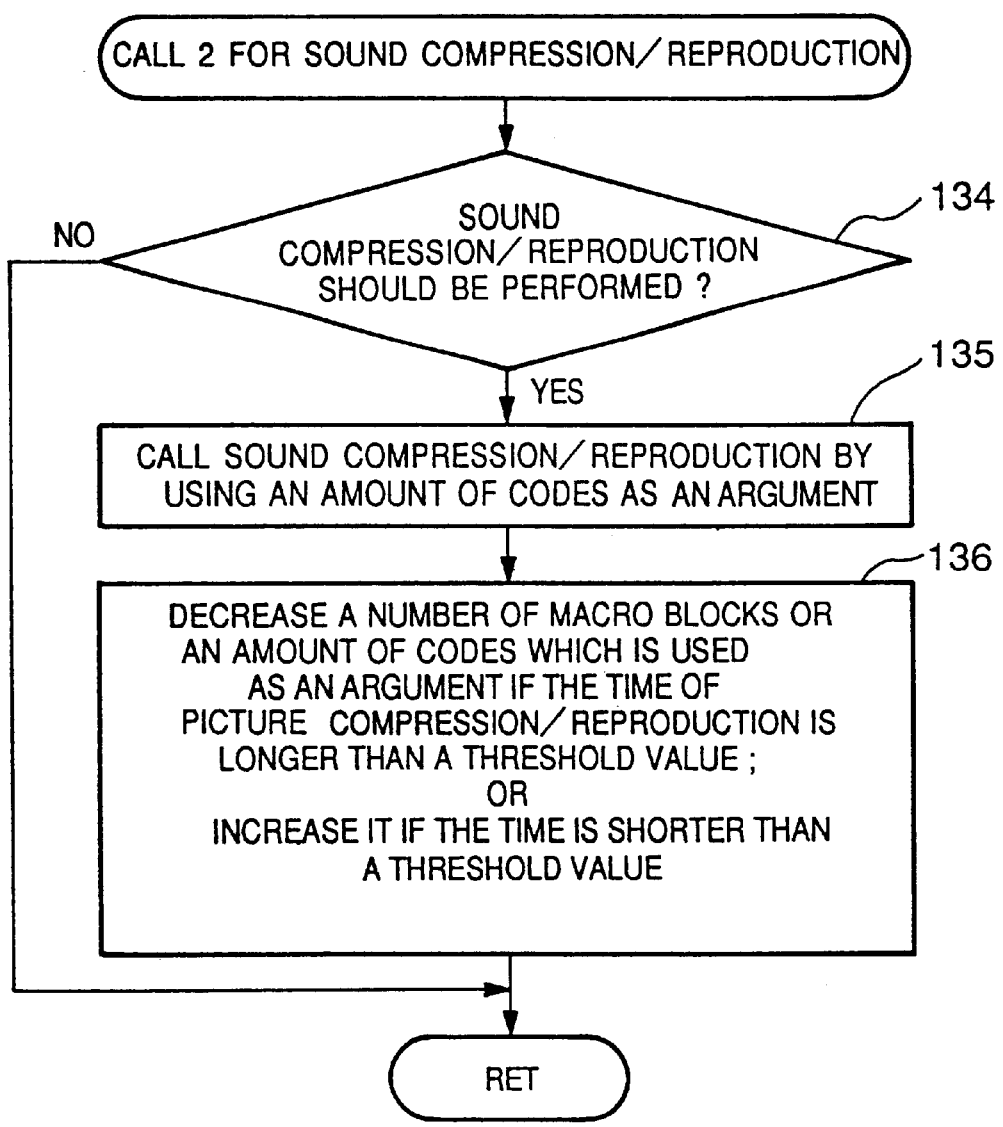
FIG. 9B is a flowchart showing a subroutine for call 2 of the sound compression/reproduction.

FIG. 8, FIG. 9A and FIG. 9B are flowcharts showing subroutines which are called during execution of the aforementioned routines.

Specifically, FIG. 8 shows a subroutine for the sound compression/reproduction. In step 137, the sound compression/reproduction unit performs the encoding/decoding operation with respect to one AUU. In step 138, a decision is made as to whether the encoding/decoding operation is completed with respect to the designated amount of codes or not. If not, the sound compression/reproduction unit proceeds back to step 137. If the above encoding/decoding operation is completed, the sound compression/reproduction unit transfers control to the calling side.

FIG. 9A shows a subroutine for call 1 of the sound compression/reproduction, which is an example of a call for the sound compression/reproduction. In step 131, the system calculates a necessary amount of sound codes on the basis of a time required for performing the picture compression/reproduction. Using the calculated amount of the sound codes as an argument, the system calls the sound compression/reproduction unit in step 132. In step 133, if the time required for performing the picture compression/reproduction is longer than a threshold value, the system decreases a number of macro blocks or an amount of codes which is used as an argument. On the other hand, if the time required for performing the picture compression/reproduction is shorter than the threshold value, the system increases a number of macro blocks or an amount of codes which is used as an argument. After completion of the step 133, the system reverts control to the calling side.

Incidentally, if the time required for performing the picture compression/reproduction is 30 ms, the calculated amount of the sound codes is equivalent to an amount of codes corresponds to a minimum number of AAUs which exceed an amount of sound codes corresponding to a time of 30 ms plus $\alpha$. Herein, $\alpha$ value of a depends on the performance of the CPU and/or the communication speed.

In addition, the threshold value as well as an increment or a decrement for increasing or decreasing the number of macro blocks or the amount of codes are adjusted in such a way that the sound compression/reproduction processing can be continued without occurrence of a break-off event. They depend on the performance of the CPU and/or the communication speed.

FIG. 9B shows a subroutine for call 2 of the sound compression/reproduction, which is another example of the call for the sound compression/reproduction or call back function. For convenience' sake, FIG. 9B omits a calculation step like the aforementioned step 131 which should be provided prior to a decision step 134. In the case of the sound compression, a decision is made in step 134, after the above calculation step, as to whether an amount of sound codes which are compressed but are not subjected to transmission is less than a threshold value or not. In the case of the sound reproduction, a decision is made in step 134 as to whether an amount of sound codes which are received but are not subjected to reproduction is greater than a threshold value. In step 135, the system uses the amount of codes as an argument to call the sound compression/reproduction unit. After leaving the step 135, the system proceeds to step 136. Herein, if a time required for performing the picture compression/reproduction is longer than a threshold value, the system decreases a number of macro blocks or an amount of codes which is used as an argument. On the other hand, if the time required for performing the picture compression/reproduction is shorter than a threshold value, the system increases a number of macro blocks or an amount of codes, which is used as an argument. After completion of the step 136, the system reverts control to the calling side.

Incidentally, if the threshold value is equivalent to a certain amount of sound codes which corresponds to a time of 30 ms, a calculated amount of sound codes is equivalent to a minimum number of AAUs which exceed a certain amount of sound codes, which is calculated as follows:

(Sound codes corresponding to 30 ms)−(remaining sound codes)+$\alpha$ where a value of $\alpha$ depends on the performance of the CPU and/or the communication speed.

Incidentally, the threshold value as well as an increment or a decrement for increasing or decreasing the number of macro blocks or the amount of codes are adjusted in such a way that the sound compression/reproduction processing can be continued without occurrence of a break-off event.

They depend on the performance of the CPU and/or the communication speed.

Lastly, the effects of the invention are summarized as follows:

This invention is designed to reduce the overhead at the switching of the parallel operation registers, so it is possible to perform the sound compression/reproduction and picture compression/reproduction at a high speed. In addition, the switching is performed at an interval of time which is selected in such a way that the sound processing does not break off. Further, different modules which separate from each other are used for the sound compression/reproduction and picture compression/reproduction respectively. So, even if a change occurs on the performance of the CPU and/or the communication speed, it is possible to adjust the switching timing with ease.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A sound-picture synchronous compression device comprising:

sound compression means for compressing sound information;

picture compression means for compressing picture information; and control means for controlling the sound compression means and the picture compression means in such a way that the sound information and the picture information are respectively compressed in a synchronized manner, wherein the control means further comprises:

picture compression instruction means for designating a prescribed amount of picture information in a picture compression instruction that is supplied to the picture compression means;

time measurement means for measuring a time that the picture compression means takes to perform picture compression on the prescribed amount of picture information in response to the picture compression instruction and without reference to said sound information;

calculation means for calculating an amount of sound information which can be compressed by the sound compression means within the measured time; and sound compression instruction means for designating the calculated amount of sound information in a sound compression instruction that is supplied to the sound compression means.

2. The device according to claim 1, wherein the control means further comprises:

means for instructing the picture compression means to continue the picture compression.

3. A sound-picture synchronous reproduction device comprising:

sound reproduction means for reproducing compressed sound information;

picture reproduction means for reproducing compressed picture information; and control means for controlling the sound reproduction means and the picture reproduction means in such a way that the compressed sound information and the compressed picture information are respectively reproduced in a synchronized manner[.], wherein the control means further comprises:

picture reproduction instruction means for designating a prescribed amount of compressed picture information in a picture reproduction instruction that is supplied to the picture reproduction means;

time measurement means for measuring a time that the picture reproduction means takes to perform picture reproduction process on the prescribed amount of compressed picture information in response to the picture reproduction instruction and without reference to said compressed sound information;

calculation means for calculating an amount of compressed sound information which can be reproduced by the sound reproduction means within the measured time; and sound reproduction instruction means for designating the calculated amount of compressed sound information in a sound reproduction instruction that is supplied to the sound reproduction means.

4. The device according to claim 3, wherein the control means further comprises:

means for instructing the picture reproduction means to continue the picture reproduction.

5. A sound-picture synchronous compression method which compresses sound information and picture information respectively in a synchronized manner, the method comprising the steps of:

designating a prescribed amount of picture information to perform picture compression;

measuring a time taken to compress the prescribed amount of picture information without reference to sound information;

calculating an amount of sound information which can be compressed within the measured time; and performing sound compression on the calculated amount of sound information.

6. The method according to claim 5, further comprising the step of:

continuing the picture compression after completion of the sound compression.

7. A sound-picture synchronous reproduction method which reproduces compressed sound information and compressed picture information in a synchronized manner, the method comprising the steps of:

designating a prescribed amount of compressed picture information to perform picture reproduction;

measuring a time taken to reproduce the prescribed amount of compressed picture information without reference to sound information;

calculating an amount of compressed sound information which can be reproduced within the measured time; and performing sound reproduction on the calculated amount of compressed sound information.

8. The method according to claim 7, further comprising the step of:

continuing the picture reproduction after completion of the sound reproduction.

9. A sound-picture synchronous compression device comprising:

picture input means for inputting picture data to produce picture codes;

sound input means for inputting sound data to produce sound codes;

designation means for designating an amount of picture codes which correspond to a numbers of macro blocks;

picture compression means for performing picture compression on the designated amount of picture codes;

calculation means for calculating an amount of sound codes which can be compressed within a time taken to compress the designated amount of picture codes, said time determined without reference to sound codes;

sound compression means for performing sound compression on the calculated amount of sound codes;

code mixing means for mixing compressed picture codes and compressed sound codes together; and transmission means for transmitting mixed codes.

10. A sound-picture synchronous reproduction device comprising:

receiving means for receiving mixed codes transmitted thereto;

code separation means for separating the mixed codes into compressed picture codes and compressed sound codes;

designation means for designating an amount of the compressed picture codes which correspond to a number of macro blocks;

picture reproduction means for performing picture reproduction on the designated amount of the compressed picture codes;

calculation means for calculating an amount of the compressed sound codes which can be reproduced within a time taken to reproduce the designated amount of the compressed picture codes, said time determined without reference to sound codes;

sound reproduction means for performing sound reproduction on the calculated amount of the compressed sound codes; and output means for outputting pictures and sounds on the basis of reproduced picture codes and reproduced sound codes.

* * * * *